(12) United States Patent
Klinglesmith et al.

(10) Patent No.: US 12,386,764 B2
(45) Date of Patent: Aug. 12, 2025

(54) SELECTIVE TRANSFER OF DATA INCLUDING A PRIORITY BYTE

(71) Applicant: SiFive, Inc., San Mateo, CA (US)

(72) Inventors: Michael Klinglesmith, Chambéry (FR); Eric Andrew Gouldey, Fort Collins, CO (US); Wesley Waylon Terpstra, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 77 days.

(21) Appl. No.: 18/497,436

(22) Filed: Oct. 30, 2023

(65) Prior Publication Data

US 2024/0184725 A1 Jun. 6, 2024

Related U.S. Application Data

(60) Provisional application No. 63/429,389, filed on Dec. 1, 2022.

(51) Int. Cl.
*G06F 12/00* (2006.01)
*G06F 13/16* (2006.01)
*G06F 13/18* (2006.01)

(52) U.S. Cl.
CPC .......... *G06F 13/18* (2013.01); *G06F 13/1678* (2013.01); *G06F 13/1689* (2013.01)

(58) Field of Classification Search
None
See application file for complete search history.

(56) References Cited

U.S. PATENT DOCUMENTS

| 6,918,019 | B2* | 7/2005 | Zsohar | G06F 13/1626 370/371 |
| 10,474,365 | B2* | 11/2019 | Stewart | G06F 3/061 |
| 2015/0180924 | A1* | 6/2015 | O'Callaghan | H04L 43/0829 709/219 |
| 2017/0255552 | A1* | 9/2017 | Chatterjee | G11C 11/4096 |

* cited by examiner

*Primary Examiner* — Daniel D Tsui
(74) *Attorney, Agent, or Firm* — Kilpatrick Townsend & Stockton LLP

(57) ABSTRACT

A data responder may determine a selection between granting a request for a priority byte to be prioritized for transmission ahead of other bytes via a bus and ignoring the request. Granting the request may include transferring a block of bytes of data across multiple clock cycles with the priority byte transferred in a first clock cycle before other clock cycles of the multiple clock cycles. Ignoring the request may include transferring the block across multiple clock cycles with the priority byte transferred in a clock cycle after the first clock cycle. The data responder may receive the request from a data requestor. The data responder may assert a signal on a wire, connected to the data requestor, to indicate a grant of the request and a transfer of the priority byte in the first clock cycle.

20 Claims, 9 Drawing Sheets

SELECTIVE TRANSFER OF DATA INCLUDING A PRIORITY BYTE

CROSS-REFERENCE TO RELATED APPLICATIONS

This application claims priority to and the benefit of U.S. Provisional Patent Application No. 63/429,389, filed Dec. 1, 2022, the entire contents of which are incorporated by reference herein for all purposes.

TECHNICAL FIELD

This disclosure relates generally to integrated circuits and, more specifically, to the selective transfer of data including a priority byte.

BACKGROUND

A System-on-Chip (SoC) is an integrated circuit that includes multiple components, devices, or modules, connected to one another. The components may include, for example, processor cores, caches, cross bars, memory controllers, and memory-mapped devices. The components may be connected so that data can be transferred between them while adhering to a cache coherence policy, such as one of the MSI (modified, shared, invalid), MESI (modified, exclusive, shared, invalid), or MOESI (modified, owned, exclusive, shared, invalid) policies. For example, the components can include agents that are connected to one another using TileLink, a chip-scale interconnect standard that provides multiple master devices with coherent memory mapped access to memory and/or slave devices.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
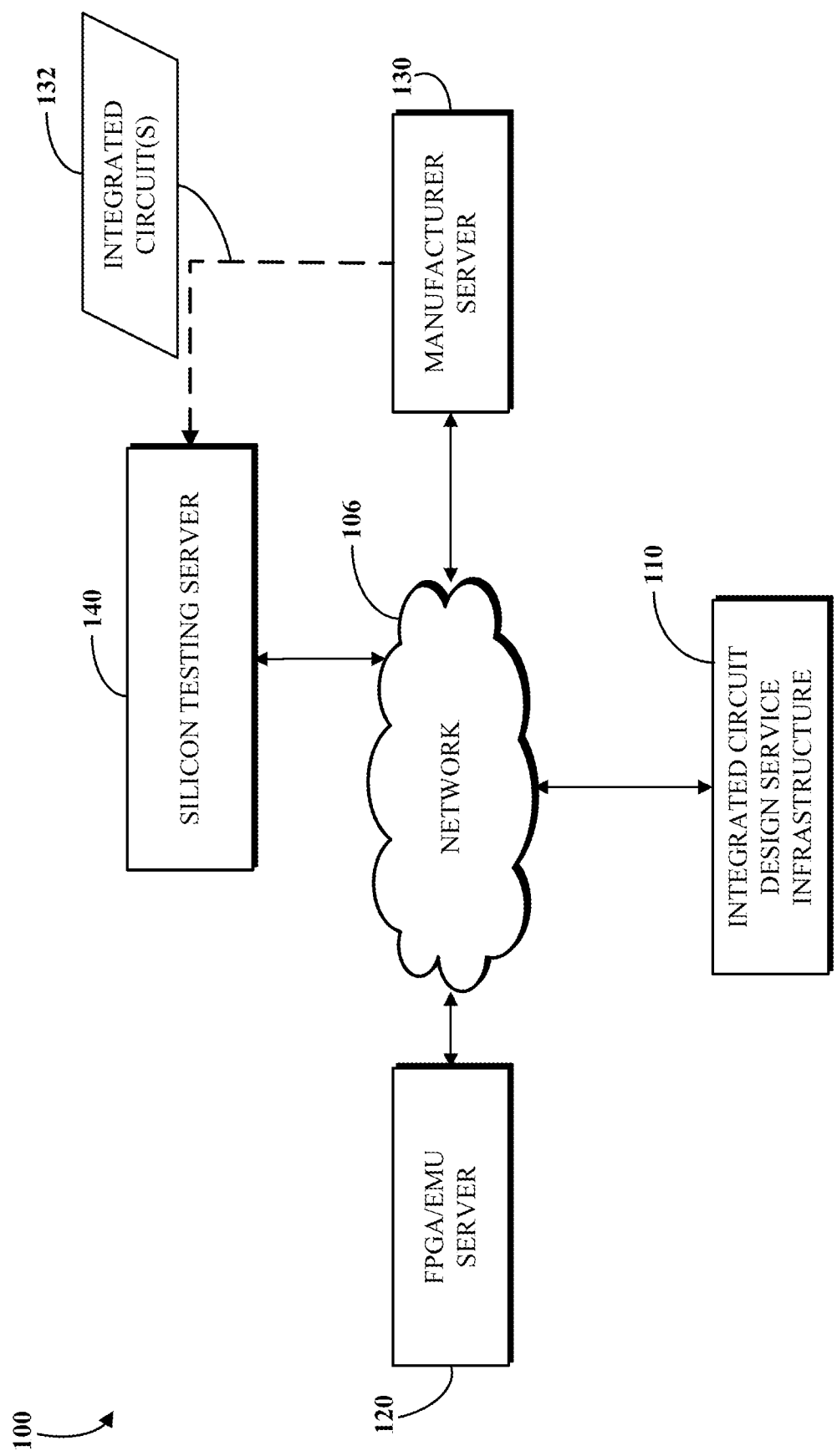
FIG. 1 is a block diagram of an exemplary system for facilitating generation and manufacture of integrated circuits.

In an SoC, a first component, device, or module may request data from a second component, device, or module during operation. For example, the first component could be a processor core executing code and the second component could be a cache, a cross bar, a memory controller, or a memory-mapped device. While the first component may request a limited amount of data, such as one or more bytes, the second component may fulfill the request by transferring more data than was requested to the first component, such as a block of bytes of data (e.g., a cache line). For example, the first component could be a 64-bit processor core that is requesting 8 bytes of data (i.e., 64 bits) due to a local cache miss, and the second component could be a shared level 2 (L2) cache that may fulfill the request by transferring a cache line (e.g., 64 bytes of data, or 512 bits) that includes the 8 bytes being requested. The cache line may be partitioned based on a natural alignment of the data in the cache (e.g., according to cache line boundary, or aligned by a page boundary, or word-aligned). For example, the cache line may be stored in a power-of-two-sized byte range in a data storage (e.g., a random-access memory (RAM), such as a static random-access memory (SRAM) or dynamic random-access memory (DRAM)).

Transferring the data from the second component to the first component may involve transferring portions of the data over multiple clock cycles (i.e., beats, or single-clock-cycle slices of a message that takes multiple cycles to transmit over a channel or bus having a particular width). For example, the first component (e.g., the processor core) may be physically connected to the second component (e.g., the shared cache) by a bus having a particular data width (e.g., 128 bits). Transferring a cache line (e.g., 64 bytes of data, or 512 bits) via the bus may involve transferring the data over multiple clock cycles (e.g., four clock cycles) due to the particular data width of the bus (e.g., 16 bytes, or 128 bits, being transferred each clock cycle). In some cases, the limited amount of data that the first component is requesting (e.g., 8 bytes of data, or 64 bits, due to the local cache miss) might not be transferred in the first clock cycle of the multiple clock cycles, but instead might be transferred in a subsequent clock cycle (e.g., the second, third, or fourth clock cycle). For example, the limited amount of data being requested could be the last byte of the cache line. This may result in some delay for the first component to receive that limited amount, possibly resulting in a performance loss.

In some cases, the latency may be addressed by enabling the first component to command that the limited amount of data be prioritized for transmission by the second component ahead of other data. The command may cause the second component to transfer the limited amount of data to the first component in a first clock cycle before other clock cycles for transferring remaining data. As blocks of bytes of data may be aligned in power-of-two-sized byte ranges in data storage, transferring a block in this way may involve wrapping the data around a wrap boundary. For example, transferring the block may involve transferring the priority byte at a first address, followed by subsequent bytes at subsequent addresses in the block until reaching the wrap boundary (e.g., the end of the power-of-two-sized byte range in the block), then returning to transfer a first byte of the block (e.g., the beginning of the power-of-two-sized byte range in the block), followed by subsequent bytes at subsequent addresses in the block until transfer of the block is complete.

While commanding a prioritization of the limited amount may improve the efficiency of the first component (e.g., by the first component receiving the data faster than had the command not been issued), in some cases, this could cause a loss of efficiency in the system. For example, transferring the limited amount of data that the first component is requesting in a first clock cycle could involve a delay by the second component. The delay could be caused, for example, by a latency associated with accessing the data from data storage and/or re-ordering the data. Thus, a trade off may exist between possible latency of the second component (e.g., accessing and/or re-ordering the data) and possible performance loss of the first component (e.g., not receiving the limited amount of data in the first clock cycle). This trade-off may be further complicated by differing components in the system being connected by buses having differing data widths. For example, when the data that the first component is requesting is not transferred in the first clock cycle, there may be a greater delay associated with transferring the data over a narrower bus (e.g., 32 bits) than transferring the data over a wider bus (e.g., 256 bits) due to the narrower bus involving more clock cycles or beats for transferring the data.

Implementations of this disclosure are designed to improve the efficiency of transferring data between components, devices, or modules implemented by an integrated circuit by enabling a data responder to select between granting a request for a priority byte and ignoring the request (e.g., disregarding, rejecting, or declining the request). The system may include a data requestor (e.g., a sender of messages, such as requests messages, or simply requests) and a data responder (e.g., a receiver of messages, such as response messages, or simply responses). The data requestor may send a request for multiple bytes of data to be transferred via the bus. The request for data may include a request (e.g., an indication, or hint that is informational only and has no direct effect on data values) for a priority byte to be prioritized for transmission ahead of other bytes. In some implementations, the request for the priority byte may be made by providing an address that fails to match a start address of a block of bytes of data (e.g., providing an address that is misaligned relative to a power-of-two-sized byte range in data storage, such as a cache line). The data responder may receive, from the data requestor, the request for the multiple bytes, including the request for the priority byte (e.g., based on the misalignment). The data responder may access the block, in the data storage, based on the block including the priority byte, and the block aligning with a natural alignment of data in the data storage (e.g., aligned relative to the power-of-two-sized byte range in the data storage, such as according to a cache line boundary, a page boundary, or a word-alignment).

The data responder may determine a selection between: (1) granting the request for the priority byte by transferring the block to the data requestor across multiple clock cycles via the bus with the priority byte transferred in a first clock cycle before other clock cycles of the multiple clock cycles (e.g., wrapping the data by transferring the last or highest address byte of the block in the data storage before transferring the first or lowest address byte of the block in the data storage), or (2) ignoring the request by transferring the block to the data requestor across multiple clock cycles via the bus with the priority byte transferred in a clock cycle after the first clock cycle (e.g., not wrapping the data, but transferring the first or lowest address byte of the block up to the last or highest address byte of the block in an order corresponding to storage of the block the data storage). In some implementations, the data responder may assert a signal on a wire, connected to the data requestor, to indicate a grant of the request and a transfer of the priority byte in the first clock cycle. The data responder may de-assert the signal on the wire to indicate ignoring the request and transfer the block across multiple clock cycles with the priority byte transferred in any clock cycle. In some implementations, the data responder may de-assert the signal on the wire to indicate ignoring the request and transfer the block across multiple clock cycles with the priority byte transferred in a clock cycle after the first clock cycle.

As a result, the data responder may select the mode by which the block is transferred so that data can be transferred in a manner that is efficient in the system. For example, the data responder may determine to ignore the request when accessing and/or re-ordering the data would cause an increase in latency that would offset or negate a performance benefit for the data requestor had the request been granted. In another example, the data responder may determine to grant the request when accessing and/or re-ordering the data would not offset or negate the performance benefit for the data requestor.

To describe some implementations in greater detail, reference is first made to examples of hardware and software structures used to implement a system including components that may selectively transfer data including a priority byte. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-5.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
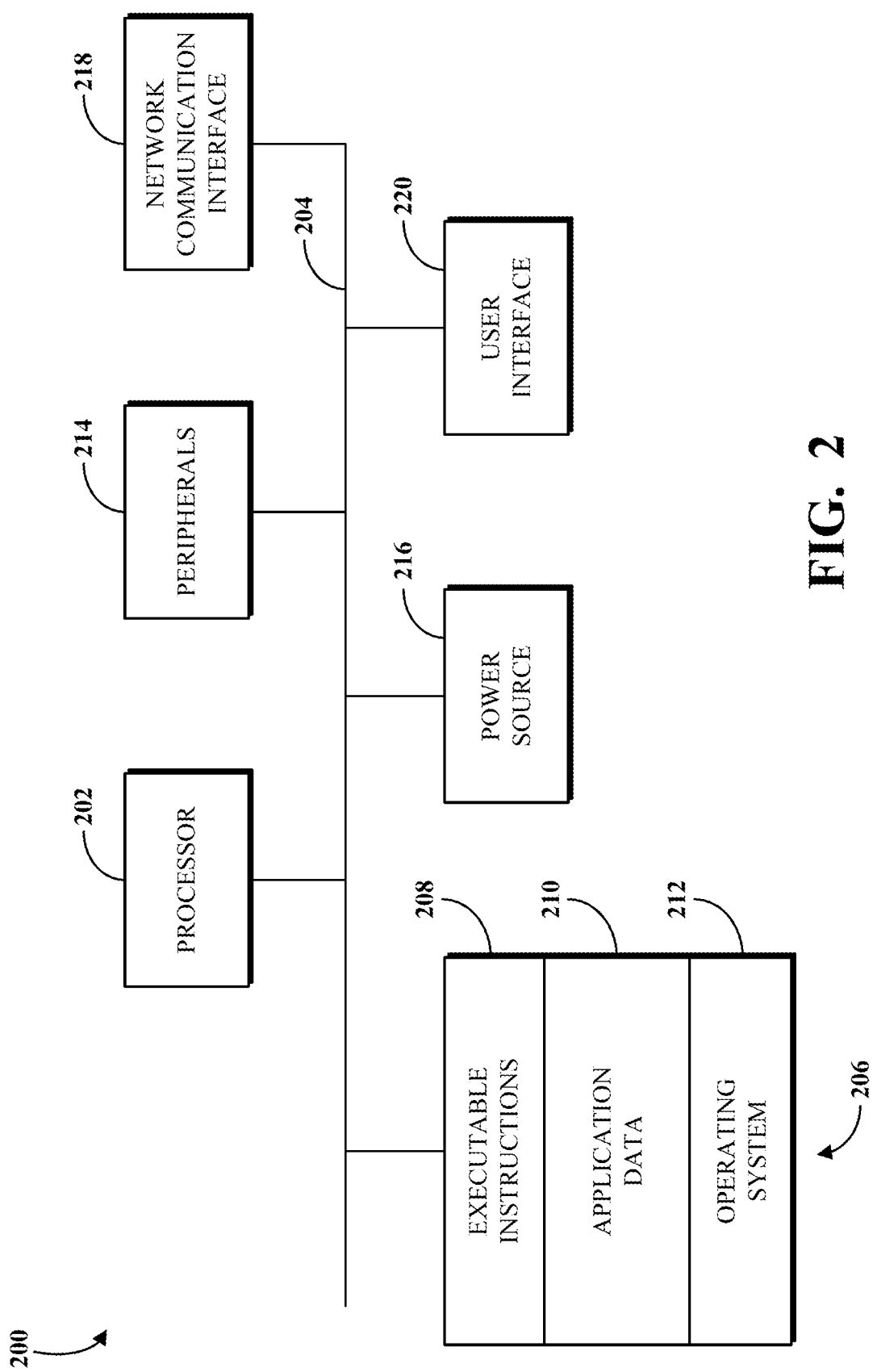
FIG. 2 is a block diagram of an exemplary system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-5.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
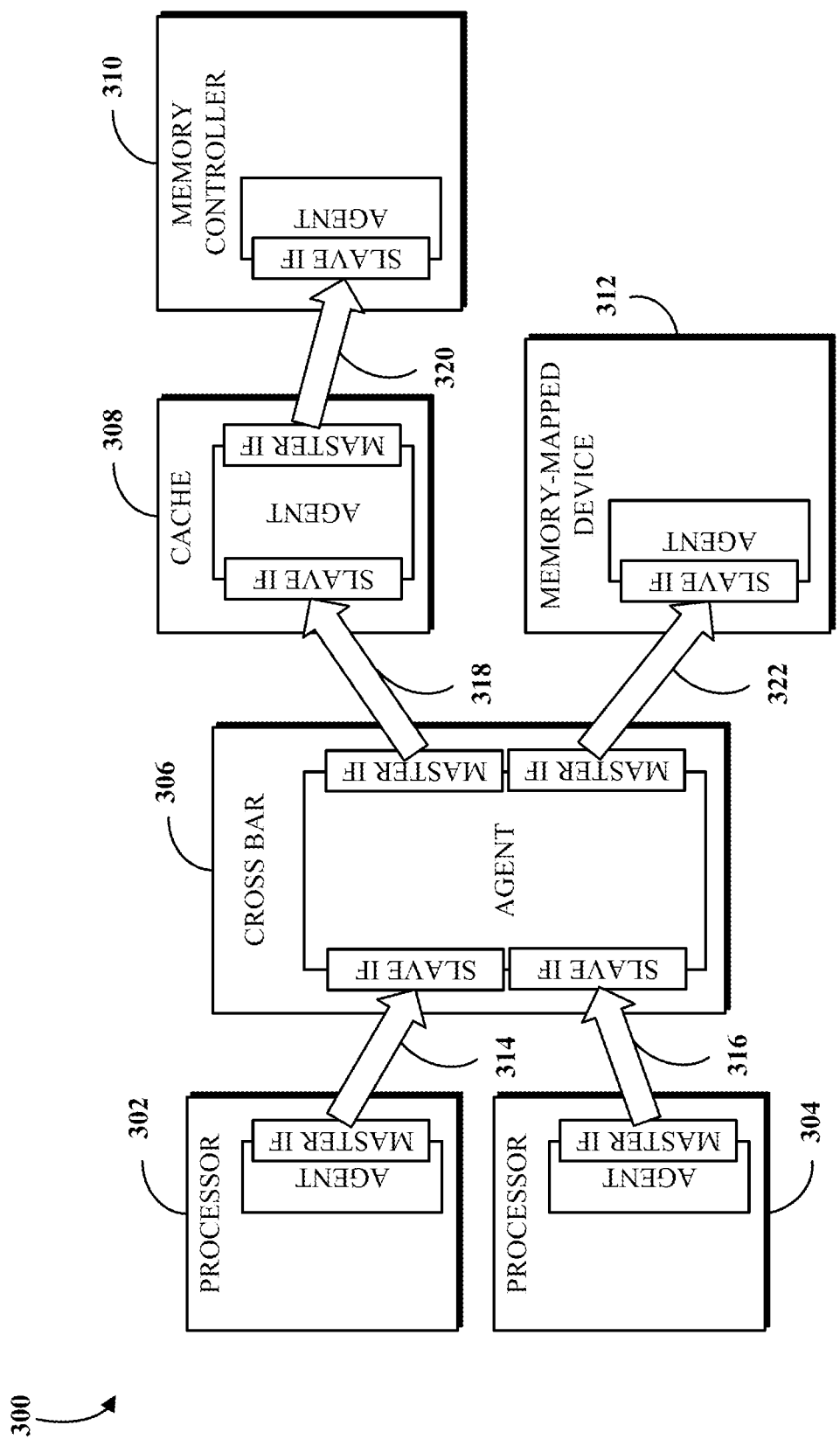
FIG. 3 is a block diagram of an exemplary system including components that may selectively transfer data including a priority byte.

FIG. 3 is a block diagram of an example of a system 300 including components that may selectively transfer data including a priority byte. The system 300 could be implemented, for example, by an SoC. The components may include, for example, a first processor core 302, a second processor core 304, a cross bar 306, a cache 308 (e.g., a shared L2 cache, implementing a data storage such as an SRAM), a memory controller 310 (e.g., implementing a data storage such as a DRAM), and a memory-mapped device 312. The components may be connected so that data can be transferred between them while adhering to a cache coherence policy, such as one of the MSI, MESI, or MOESI policies. For example, the components can include agents that are connected to one another so that messages involving data can be transferred between them (e.g., sending and receiving) while adhering to the cache coherence policy. For example, the agents may be connected to one another using TileLink, a chip-scale interconnect standard that provides multiple masters with coherent memory mapped access to memory and/or slave devices.

The agents implemented by the components may implement point-to-point links for communicating the messages to one another. The messages may include, for example, requests (e.g., a request for data), responses (e.g., transferring the data), and acknowledgments. An agent may implement one or more master interfaces and/or one or more slave interfaces for communicating the messages. An agent with a master interface may request an agent with a slave interface to perform memory operations, or may request permission to transfer and cache copies of data. An agent with a slave interface may manage permissions and access to a range of addresses, including performing memory operations on behalf of requests arriving from a master interface. Thus, connected agents may send and receive messages over links to perform operations on shared address space.

For example, in the system 300, the first processor core 302 and the second processor core 304 may each include an agent having a master interface. The cross bar 306 may include an agent having a first slave interface, a second slave interface, a first master interface, and a second master interface. The master interface of the first processor core 302 may connect to the first slave interface of the cross bar 306 by a link 314. The master interface of the second processor core 304 may connect to the second slave interface of the cross bar 306 by a link 316. The cache 308 may include an agent having a slave interface and a master interface. The first master interface of the cross bar 306 may connect to the slave interface of the cache 308 by a link 318. The memory controller 310 may include an agent having a slave interface. The master interface of the cache 308 may connect to the slave interface of the memory controller 310 by a link 320. The memory-mapped device 312 may include an agent having a slave interface. The second master interface of the cross bar 306 may connect to the slave interface of the memory-mapped device 312 by a link 322. The agents implemented by the first processor core 302, the second processor core 304, the cross bar 306, the cache 308, the memory controller 310, and the memory-mapped device 312, may send and receive messages over their respective links, links 314, 316, 318, 320, and 322, to perform operations on shared address space.

Figure 4:
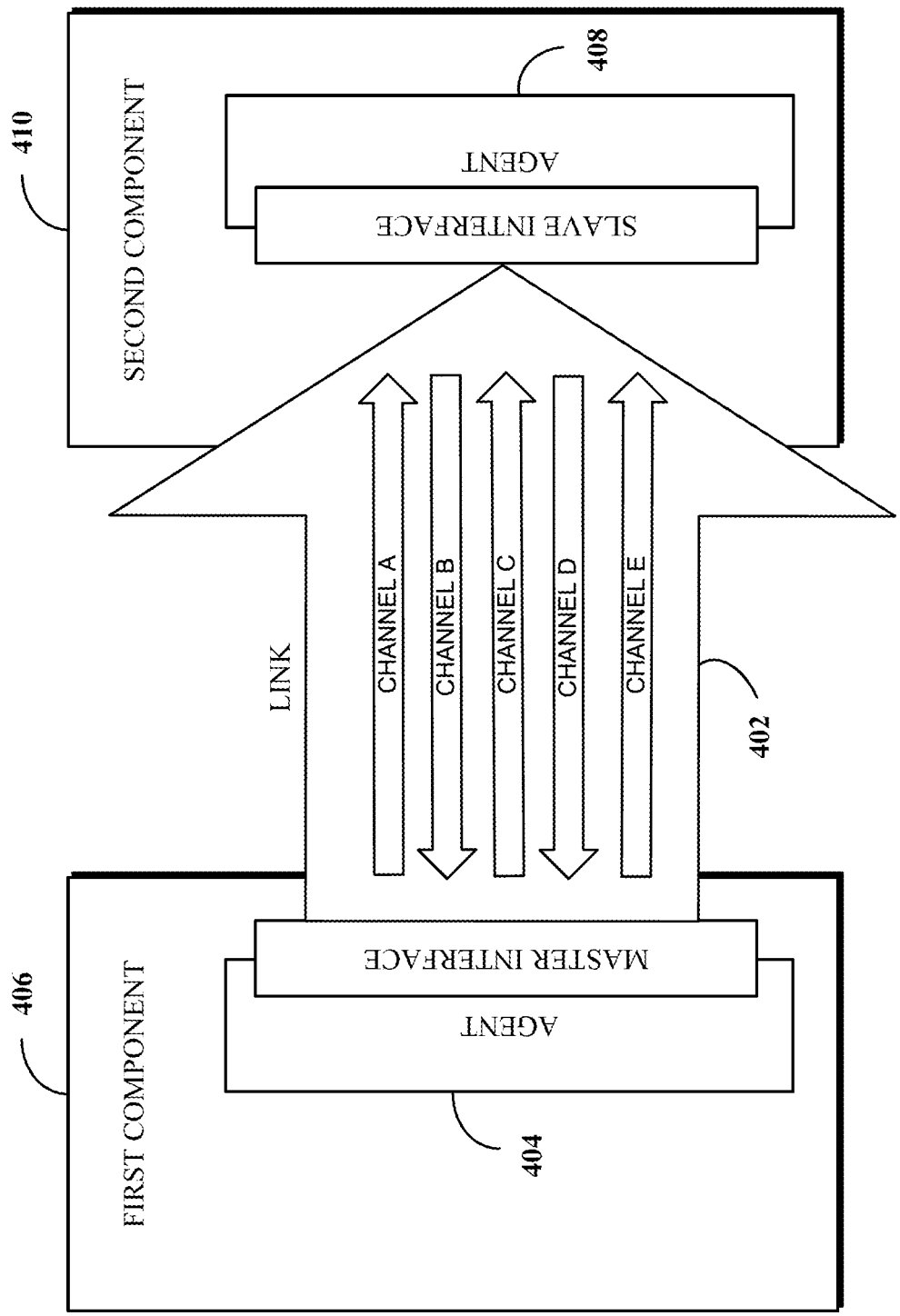
FIG. 4 is a block diagram of an exemplary link between agents implemented by components that may selectively transfer data including a priority byte.

FIG. 4 is a block diagram of an example of a link 402 between agents implemented by components in a system, such as between an agent 404 implemented by a first component 406 and an agent 408 implemented by second component 410. For example, the link 402 could be one of the links, 314, 316, 318, 320, or 322, shown in FIG. 3. The link 402 may be used to selectively transfer data including a priority byte.

The agent 404 implemented by the first component 406 may include a master interface, and the agent 408 implemented by the second component 410 may include a slave interface. For example, the first component 406 could be the first processor core 302, and the second component 410 could be the cross bar 306, the cache 308, or the memory-controller 310. The master interface of the agent 404 may connect to the slave interface of the agent 408 by the link 402. The connected agents 404 and 408 may send and receive messages to one another over point-to-point channels of the link 402, such as one of the Channel A through E implemented by the link 402. For example, the agents 404 and 408 may send and receive messages to perform operations on a shared address space. An operation may include, for example, a change to an address range's data values, permissions, or location in a memory hierarchy. A message may include a set of control and data values sent over a particular channel (e.g., one of the Channel A through E). The channels may be logically independent from one another for communicating the messages. A priority may be specified among the channels, such as a prioritization in which messages on Channel A have a lower priority with messages on Channel E having the highest priority (e.g., a prioritization of channels A<B<C<D<E for messages across the channels). The channels may contain transaction control signals and a bus for exchanging data (e.g., a physical bus having a particular data width, such as 128 bits). The channels may be directional, in that each channel may pass messages either from a master interface to a slave interface or from a slave interface to a master interface.

For example, Channel A may enable the agent having the master interface (e.g., the agent 404) to transmit a request to the agent having the slave interface (e.g., the agent 408), such as a request that an operation be performed on a specified address range, such as accessing or caching data. Channel D may enable the agent having the slave interface (e.g., the agent 408) to transmit a data response or acknowledgment message back to the original requestor (e.g., the agent 404). In some implementations, Channels B, C, and E may also be present. Channel B may enable the agent having the slave interface (e.g., the agent 408) to transmit a request to the agent having the master interface (e.g., the agent 404), such as a request that an operation be performed at an address cached by a master (e.g., the agent 404), such as for accessing or writing back cached data. Channel C may enable the agent having the master interface (e.g., the agent 404) to transmit back to the agent having the slave interface (e.g., the agent 408) data or an acknowledgment message in response to the request. Channel E may enable the agent having the master interface (e.g., the agent 404) to transmit back to the agent having the slave interface (e.g., the agent 408) a final acknowledgment of a cache line or block transfer from the original requestor (e.g., the agent 404).

Figure 5:
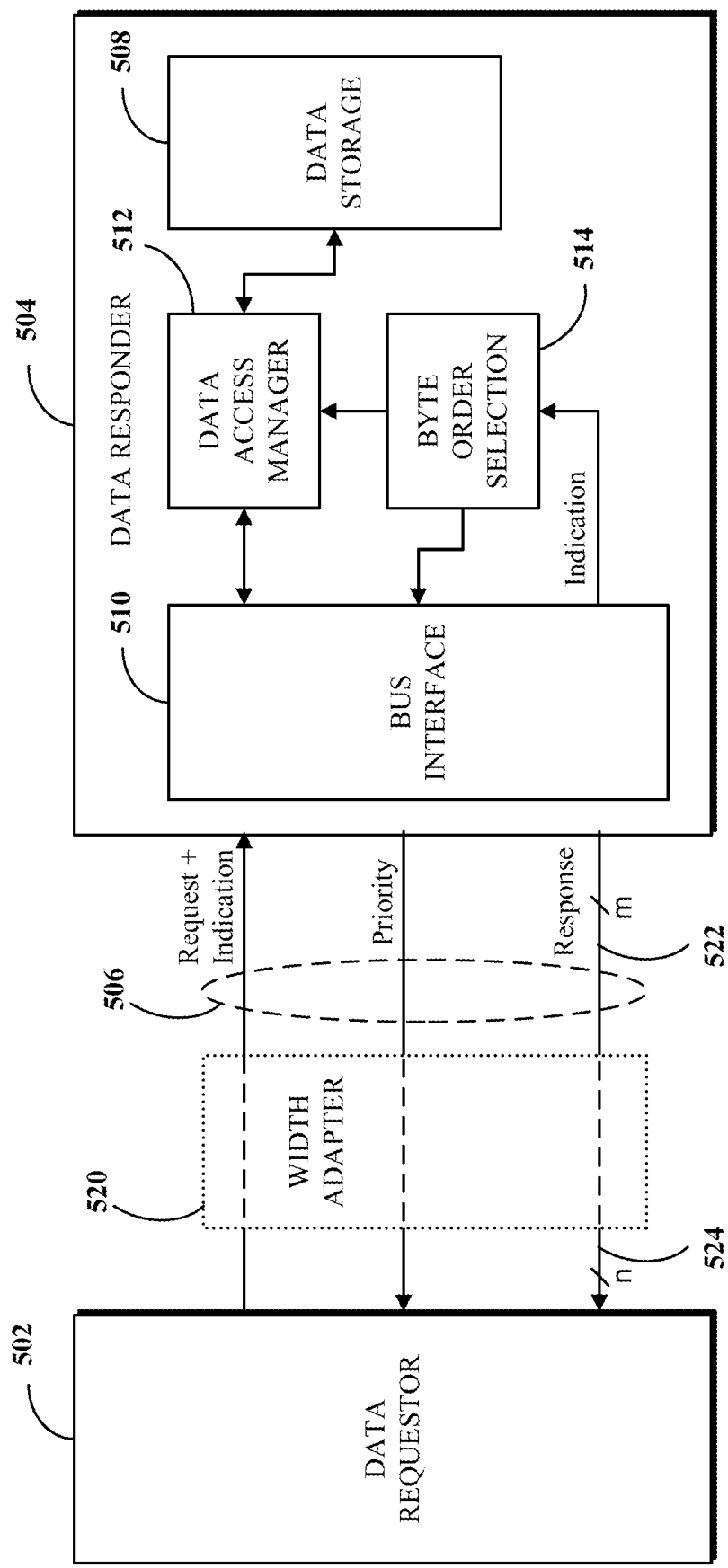
FIG. 5 is a block diagram of an exemplary data requestor requesting and receiving data from a data responder.

FIG. 5 is a block diagram of an example of a data requestor 502 requesting and receiving data from a data responder 504. For example, the data requestor 502 could be implemented by a first component having an agent, such as the first component 406 shown in FIG. 4, and the data responder 504 could be implemented by a second component having an agent, such as the second component 410 shown in FIG. 4. The data requestor 502 may communicate with the data responder 504 by a link 506, which may be like the link 402 shown in FIG. 4. The link 506 may include channels that contain both transaction control signals and a bus to exchange data (e.g., a physical bus having a particular data width, such as 128 bits). For example, the link 506 may include the Channel A in which the data requestor 502 may transmit a request (e.g., to the data responder 504) that an operation be performed on a specified address range, such as accessing or caching data, and may also include the Channel D in which the data responder 504 may transmit a data response or acknowledgment message back to the original requestor (e.g., the data requestor 502), including via the bus having the particular data width.

The data requestor 502 may send a request (e.g., "Request," such as via Channel A) for multiple bytes of data (e.g., 8 bytes of data) to be transferred via the bus (e.g., "Response," such as via Channel D). The request for data may include a request for a priority byte (e.g., "Indication," or hint, such as one or more of the 8 bytes of data being requested) to be prioritized for transmission ahead of other bytes. For example, the data requestor 502 may select the priority byte from among the multiple bytes of data that are requested.

In some implementations, the request for the priority byte may be made by providing an address that fails to match a start address of a block of bytes of data (e.g., a cache line) in a data storage 508. For example, the data requestor 502 may request the priority byte by providing an address that is misaligned relative to a power-of-two-sized byte range in the data storage 508, such as an address that is misaligned relative to the block or the cache line. For example, the data requestor 502 could be a processor core, such as the first processor core 302, requesting a limited amount of data (e.g., 8 bytes of data, or 64 bits) due to a local cache miss. In other examples, the data requestor 502 could be a cross bar, a cache, a memory controller, or a memory-mapped device, such as the cross bar 306, the cache 308, the memory controller 310, or the memory-mapped device 312, as shown in FIG. 3.

The data responder 504 may receive from the data requestor 502 the request for the multiple bytes, including the request for the priority byte (e.g., one or more of the 8 bytes of data being requested, such as due to the local cache miss). The data responder 504 may receive the request via a bus interface 510 connected to the physical bus that is connected between the data requestor 502 and the data responder 504 (e.g., implemented by the link 506). The data responder 504 may detect the request for the priority byte (e.g., "Indication") based on the misalignment (e.g., the address failing to match the start address of a power-of-two-sized byte range in the data storage 508). For example, the data responder 504 could be a cache, such as the cache 308, fulfilling a request by a processor core, such as the first processor core 302, by transferring a block or cache line (e.g., 64 bytes of data, or 512 bits) that includes the 8 bytes being requested and additional bytes in the block. In other examples, the data responder 504 could be a processor core, a cross bar, a memory controller, or a memory-mapped device, such as the first processor core 302, the cross bar 306, the memory controller 310, or the memory-mapped device 312, as shown in FIG. 3.

The data responder 504 may access the block in the data storage 508 via a data access manager 512. The data responder 504 may access the block based on the block including the priority byte (e.g., the one or more of the 8 bytes of data being requested) and the block aligning with a natural alignment of data in the data storage 508 (e.g., aligned relative to the power-of-two-sized byte range in the data storage 508, such as according to a cache line boundary, a page boundary, or a word-alignment). The data responder 504 may determine, via byte order selection 514, a selection between: (1) granting the request for the priority byte by transferring the block to the data requestor 502 across multiple clock cycles via the bus (e.g., the physical bus having the particular data width, such as 128 bits) with the priority byte transferred in a first clock cycle before other clock cycles of the multiple clock cycles, or (2) ignoring the request by transferring the block to the data requestor 502 across multiple clock cycles via the bus with the priority byte transferred in a clock cycle after the first clock cycle. Granting the request may include wrapping the data by transferring the last or highest address byte of the block in the data storage 508 before transferring the first or lowest address byte of the block in the data storage 508. Ignoring the request may include not wrapping the data, but transferring the first or lowest address byte of the block up to the last or highest address byte of the block in an order corresponding to storage of the block in the data storage 508. The data responder 504 may respond with the data (e.g., "Response") transferred to the data requestor 502, with the data being provided in a byte order based on the selection.

In some implementations, the data responder 504 may determine a selection that grants or ignores the request for the priority byte based on a latency associated with accessing and/or re-ordering the priority byte in the data storage 508. For example, the data responder 504 may determine to grant the request when accessing and/or re-ordering the data would not offset or negate the performance benefit for the data requestor 502 (e.g., grant the request when determining the delay would be less than the performance gain). The data responder 504 may determine to ignore the request when accessing and/or re-ordering the data would cause an increase in latency that would offset or negate a performance benefit for the data requestor 502 had the request been granted (e.g., ignore the request when determining the delay would be equal to or greater than the performance gain).

In some implementations, the data responder 504 may determine a selection that grants or ignores the request for the priority byte based on a data width associated with the bus implemented by the link 506. For example, the data responder 504 may determine to grant the request when the bus is relatively narrow (e.g., 32 bits) due to a greater number of clock cycles that may be involved for transferring the priority byte (e.g., grant the request when determining there would be an increased delay, greater than a threshold, for the data requestor 502 to receive the priority byte due to an excessive number of clock cycles). The data responder 504 may determine to ignore the request when the bus is relatively wide (e.g., 256 bits) due to the fewer number of clock cycles that may be involved for transferring the priority byte (e.g., ignore the request when determining the delay would be limited, or less than a threshold, for the data requestor 502 to receive the priority byte, due to a limited number of clock cycles).

The data responder 504 may assert a signal (e.g., "Priority") on a wire, connected to the data requestor 502, to indicate a grant of the request for the priority byte and a transfer of the priority byte in the first clock cycle. The wire may be implemented by the link 506. The data responder 504 may de-assert the signal on the wire to indicate ignoring the request for the priority byte and transferring the block across multiple clock cycles with the priority byte transferred in a clock cycle after the first clock cycle. In some implementations, the data responder 504 may assert or de-assert the signal on the wire, indicating granting or ignoring the request for the priority byte, based on the latency associated with accessing and/or re-ordering the priority byte in the data storage 508, and/or based on the data width of the bus implemented by the link 506.

In some implementations, the link 506 may comprise a data bus, which conveys a Response, consisting of a first bus 522 having a first data width and which is associated the data responder 504, and a second bus 524 having a second data width and which is associated with the data requestor 502, where the first and second data widths are not equal. For example, the first data width may be 64 bits, i.e., the first bus 522 may convey a 64-bit word per clock cycle of an associated first transmit clock, and the second data width may be 32 bits, i.e., the second bus 524 may convey a 32-bit word per clock cycle of an associated second transmit clock cycle. In such implementations, a width adapter 520 component may function as a data relay between the first bus 522 and the second bus 524, relaying data conveyed on the first bus 522 for transmission on the second bus 524, or vice versa, depending on the direction of data transmission.

When relaying data from a narrower bus to a wider bus, the width adapter 520 may aggregate more than one narrower word conveyed on the narrower bus (in more than one clock cycle associated therewith) into one wider word for transmission on the wider bus (in one clock cycle associated therewith). For example, given a data transmission from a 32-bit wide first bus 522 to a 64-bit wide second bus 524, the width adapter may aggregate two 32-bit words conveyed on the first bus 522 into one 64-bit word for transmission on the second bus 524. In this case, the width adapter 520 need not consider whether a priority byte has been prioritized for transmission ahead of other bytes by a data responder 504 because the priority byte would be included in the first word on the first (narrower) bus 522 in the first clock cycle associated therewith, and consequently, would necessarily be included in the first word on the second (wider) bus 524 in the first clock cycle associated therewith.

However, when relaying data from a wider bus to a narrower bus, the width adapter 520 may disaggregate one wider word conveyed on the wider bus (in one clock cycle associated therewith) into more than one narrower word for transmission on the narrower bus (in more than one clock cycle associated therewith). For example, given a data transmission from a 64-bit wide first bus 522 to a 32-bit wide second bus 524, the width adapter 520 may disaggregate one 64-bit word conveyed on the first bus 522 into two 32-bit words for transmission on the second bus 524. In this case, the width adapter 520 may consider whether a priority byte has been prioritized for transmission ahead of other bytes by a data responder 504. In some implementations, this may be achieved by examining whether the Priority signal has been asserted by the data responder 504. Further, the width adapter 520 may consider a location of the priority byte within the first word conveyed on the first (wider) bus 522 in the first clock cycle associated therewith to ensure that the width adapter 520 includes the priority byte in the first word conveyed on the second (narrower) bus 524 in the first clock cycle associated therewith.

In some implementations, the width adapter 520 may receive the Indication sent from the data requestor 502 and store information representative of an address that fails to match a start address of the block in a data storage 508, where a start address may be the start of a power-of-two-sized byte range in the data storage 508. In some implementations, the width adapter may store the address or a portion thereof; in some implementations, the width adapter may store an offset between the address and the start address of the block of data in the data storage 508; in some implementations, the width adapter may store information representative of the address that fails to match a start address of the block in the data storage 508, e.g., a single bit flag indicating a modulus of the priority byte address with respect to the natural alignment of data in the data storage 508. Thus, when the width adapter 520 receives the first (wider) data word, that includes the priority byte, on the first (wider) data bus 522 in the first clock cycle associated therewith, wherein the priority byte is at a location on the first (wider) data bus (i.e., at a location within the first (wider) data word) according to the stored information, the width adapter 520 can use the stored information and a comparison, e.g., a ratio, of the width of the first (wider) data bus 522 to the width of the second (narrow) data bus 524, to ensure that the priority byte is included in the first (narrower) data word transmitted on the second (narrower) data bus 524 in the first clock cycle associated therewith.

In other words and with reference to FIG. 5, the width adapter 520 may be configured to receive the Indication from the data requestor 502 and to store information representative of the address that fails to match the start address of the block in the data storage 508. The width adapter 520 may be further configured to receive, from the data responder 504 via the first data bus 522 having a first width m, a block of bytes of data having the priority byte in a first clock cycle of a first clock signal, wherein a location of the priority byte on the first data bus 522 is according to the information. The width adapter 520 may be further configured to forward, to the data requestor 502 via the second data bus 524 having a second width n that is narrower than the first width m, the block of bytes of data having the priority byte in a first clock cycle of a second clock signal, wherein a location of the priority byte on the second data bus 524 is according to the information and a ratio of the first width m to the second width n.

Figure 6:
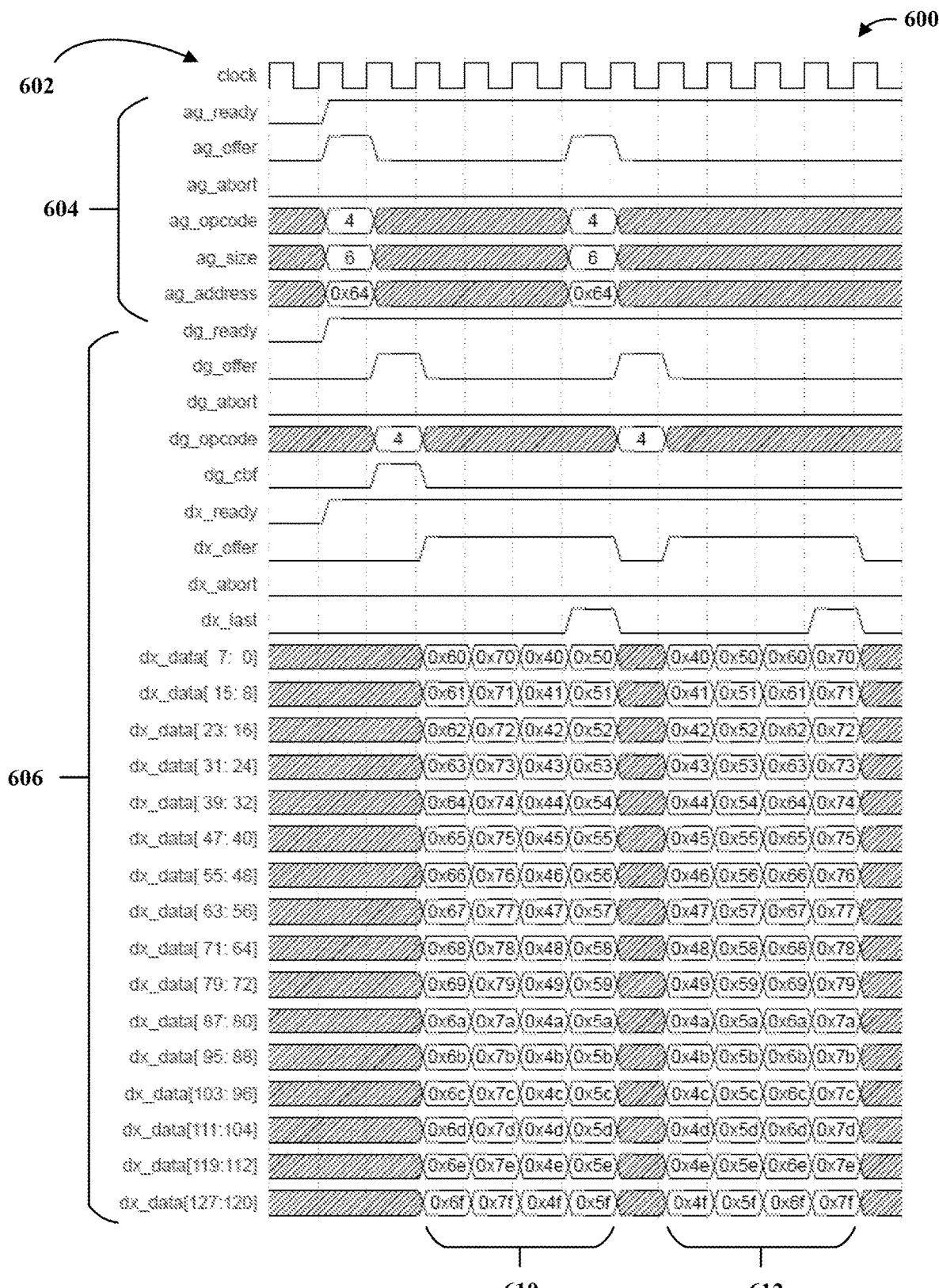
FIG. 6 is an exemplary timing diagram for selectively transferring data including a priority byte.

FIG. 6 is an example of a timing diagram 600 for selectively transferring data including a priority byte. The timing diagram 600 may be in relation to the data requestor 502 requesting and receiving data from the data responder 504 as shown in FIG. 5. The timing diagram 600 is referenced by a clock 602 which could be implemented by the link 506 between the data requestor 502 and the data responder 504. The timing diagram 600 illustrates two requests for data from the data requestor 502 and two responses with data from the data responder 504. The first request may include a request for the priority byte sent by the data requestor 502, and the first response may include data sent by the data responder 504 in response to the first request where the request for the priority byte is granted. The second request may include another request for the priority byte sent by the data requestor 502, and the second response may include data sent by the data responder 504 in response to the second request where the request for the priority byte is ignored.

For the first request, the data requestor 502 may send a request for multiple bytes of data (e.g., the "Request" shown in FIG. 5, indicated by a first assertion of Channel A signals 604, including "ag_offer," "ag_opcode," "ag_size," and "ag_data" shown in FIG. 6). The request for data may include a request for a priority byte to be prioritized for transmission ahead of other bytes. For example, the priority byte may be a byte at an address 0x64 (hexadecimal) in the data storage 508. The request for the priority byte may be made by the data requestor 502 providing the address for the data request (e.g., 0x64) that fails to match a start address (e.g., 0x40) of a block of bytes of data in the data storage 508 (e.g., the 0x64 address is misaligned relative to a power-of-two-sized byte range in the data storage which starts at the 0x40).

The data responder 504 may receive the request for the multiple bytes. The data responder 504 may detect the request for the priority byte (e.g., the byte at address 0x64) based on the misalignment of the address provided by the data requestor 502 in the request (e.g., the 0x64 address failing to match the start address of the power-of-two-sized byte range in the data storage 508). Based on the detection, the data responder 504 may determine whether to grant or ignore the request for the priority byte. For example, the data responder 504 may determine to grant the request based on a latency associated with accessing the data from the data storage 508, based on a latency associated with re-ordering the data, and/or based on a data width associated with the bus implemented by the link 506. In the first response, the data responder 504 selects granting the request for the priority byte, and transfers the block (e.g., the "Response" shown in FIG. 5, indicated by a first group of data assertions 610 of Channel D signals 606, including "dx_data" shown in FIG. 6) to the data requestor 502 across multiple clock cycles via the bus (e.g., four clock cycles in this case, based on the bus having a data width of 128 bits) with the priority byte (e.g., the byte at address 0x64) transferred in a first clock cycle of the multiple clock cycles (e.g., transferred in an 8 bit byte lane indicated by "dx_data[39:32]"). Further, the data responder 504 may assert a signal (e.g., the "Priority" shown in FIG. 5, indicated by "dg_cbf" shown in FIG. 6) on a wire connected to the data requestor 502 to indicate to the data requestor 502 the grant of the request for the priority byte (e.g., the byte at address 0x64) and the associated transfer of the priority byte in the first clock cycle.

Figure 7:
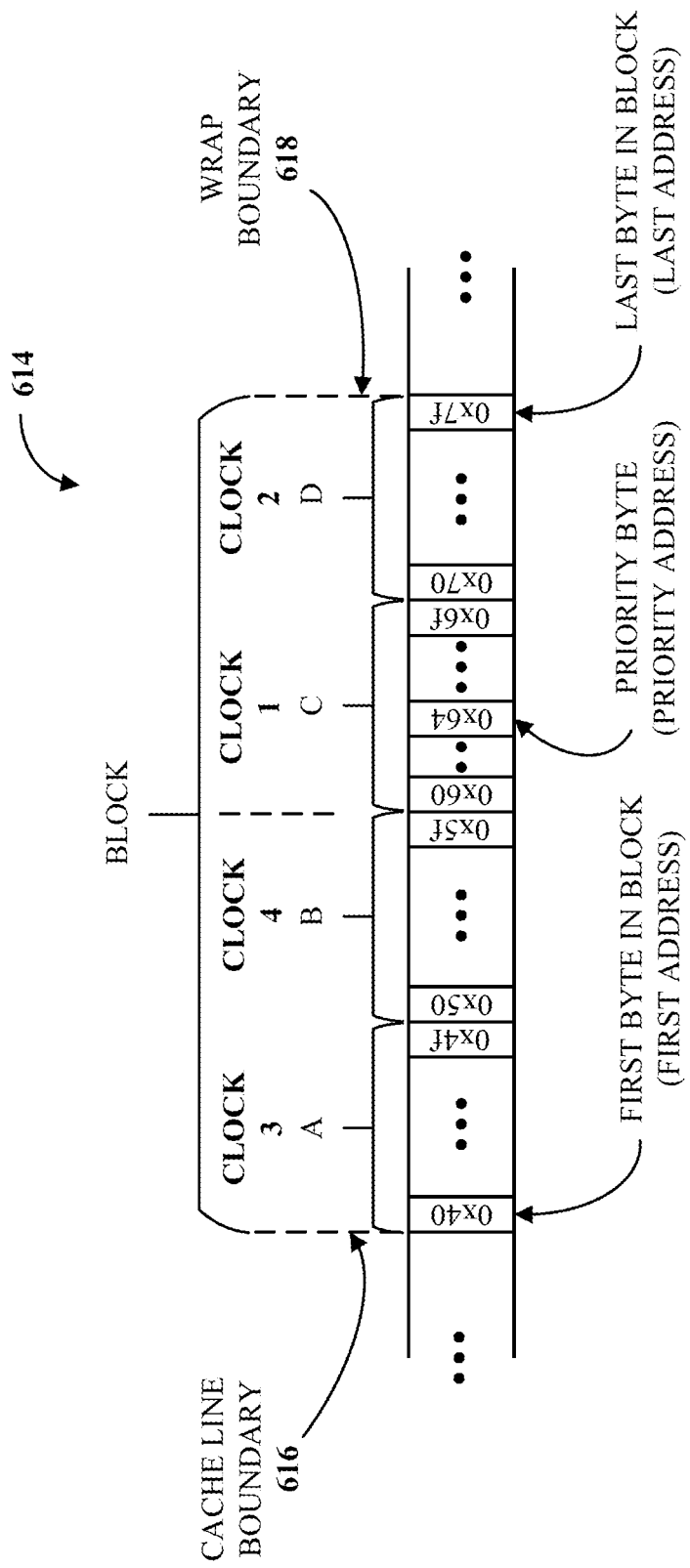
FIG. 7 is an exemplary block of data in which a sub-block including a priority byte is transferred in a first clock cycle.

With additional reference to FIG. 7, block 614 may be the block in the data storage 508. For example, the block 614 may include the priority byte (e.g., the byte at address 0x64). The block 614 may align with a natural alignment of data in the data storage 508 in a power-of-two-sized byte range. For example, the block 614 could be a cache line that is aligned at a cache line boundary 616, or a page boundary, or is aligned based on a word-alignment. For example, the block 614 may begin with a first byte stored at address 0x40, and may end with a last byte stored at address 0x7f, thereby storing 64 bytes of a cache line. The block 614 may include multiple sub-blocks of bytes of data, such as sub-blocks A, B, C, and D (e.g., corresponding to an order in which the bytes are stored in memory). A sub-block may represent an amount of data that may be transferred by the data responder 504 in one clock cycle or beat. For example, with the bus having a data width of 128 bits, or 16 bytes, the block 614, storing 64 bytes, may include four sub-blocks of 16 bytes each (e.g., sub-block A from 0x40 and 0x4f, sub-block B from 0x50 and 0x5f, sub-block C from 0x60 and 0x6f, and sub-block D from 0x70 and 0x7f). The four sub-blocks A, B, C, and D could be transferred to the data requestor 502, in an order determined by the data responder 504, across the multiple clock cycles. In this example, the priority byte (e.g., the byte at address 0x64) may be in sub-block C, and the data responder 504 may grant the request for the priority byte in the first clock cycle. As a result, in the first group of data assertions 610, the data responder 504 may transfer sub-block C (e.g., including the priority byte at the byte at address 0x64) in the first clock cycle (e.g., "Clock 1"), followed by sub-block D in the second clock cycle (e.g., "Clock 2"), followed by sub-block A in the third clock cycle (e.g., "Clock 3"), and followed by sub-block B in the fourth clock cycle (e.g., "Clock 4"). In other words, transferring the block 614 may include wrapping the sequence of bytes of the block 614 at a wrap boundary 618 (e.g., wrapping after transferring the last sub-block, sub-block D, by returning to transfer the first sub-block, sub-block A, followed by remaining sub-blocks, such as sub-block B).

Referring back to FIG. 6, for the second request, the data requestor 502 may send a request for multiple bytes of data (e.g., the "Request" shown in FIG. 5, indicated by a second assertion of Channel A signals 604, including "ag_offer," "ag_opcode," "ag_size," and "ag_data" shown in FIG. 6). The request for data may again include a request for a priority byte to be prioritized for transmission ahead of other bytes. For example, the priority byte may be the byte at address 0x64.

The data responder 504 may receive the request for the multiple bytes. The data responder 504 may detect the request for the priority byte (e.g., the byte at address 0x64) based on the misalignment of the provided by the data requestor 502 in the request (e.g., the 0x64 address failing to match the start address of the power-of-two-sized byte range in the data storage 508). Based on the detection, the data responder 504 may determine whether to grant or ignore the request for the priority byte (e.g., the byte at address 0x64). For example, the data responder 504 may determine to ignore the request based on a latency associated with accessing the data from the data storage 508, based on a latency associated with re-ordering the data, and/or based on a data width associated with the bus implemented by the link 506. In the second response, the data responder 504 selects ignoring the request for the priority byte, and transfers the block (e.g., the "Response" shown in FIG. 5, indicated by a second group of data assertions 612 of Channel D signals 606, including "dx_data" shown in FIG. 6) to the data requestor 502 across multiple clock cycles via the bus (e.g., four clock cycles in this case, based on the bus having a data width of 128 bits) with the priority byte (e.g., the byte at address 0x64) transferred in a clock cycle after the first clock cycle (e.g., transferred in a third clock cycle in the 8 bit byte lane indicated by "dx_data[39:32]"). Further, the data responder 504 may de-assert the signal (e.g., the "Priority" shown in FIG. 5, indicated by "dg_cbf" shown in FIG. 6) on the wire connected to the data requestor 502 to indicate to the data requestor 502 the ignoring of the request for the priority byte and transferring the block across multiple clock cycles with the priority byte (e.g., the byte at address 0x64) and the associated transfer of the priority byte in a clock cycle after the first clock cycle (e.g., based on the alignment of the block in the data storage 508).

Figure 8:
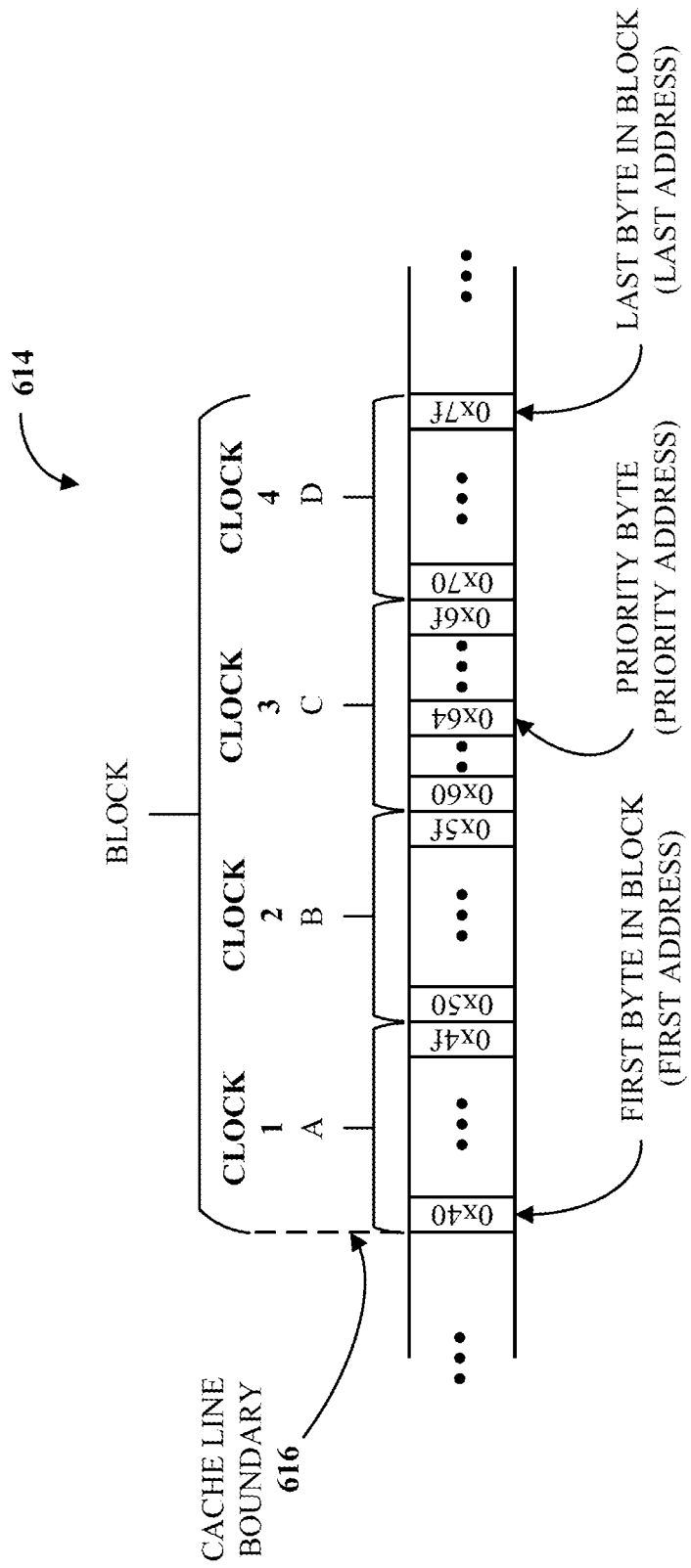
FIG. 8 is an exemplary block of data in which a sub-block including a priority byte is transferred in a clock cycle after a first clock cycle.

With additional reference to FIG. 8, the data responder 504 may ignore the request for the priority byte when transferring the block 614. As a result, in the second group of data assertions 612, the data responder 504 may transfer sub-block A in the first clock cycle (e.g., "Clock 1"), followed by sub-block B in the second clock cycle (e.g., "Clock 2"), followed by sub-block C (e.g., including the priority byte at the byte at address 0x64) in the third clock cycle (e.g., "Clock 3"), and followed by sub-block D in the fourth clock cycle (e.g., "Clock 4"). In other words, transfer of the block 614 may be without wrapping the data at a wrap boundary (e.g., the wrap boundary 618), and instead transferring the first or lowest address byte of the block (e.g., the byte at the start address 0x40, in the sub-block A) up to the last or highest address byte of the block (e.g., the byte at the end address 0x7f, in the sub-block D) in the order corresponding to storage of the bytes and the sub-blocks in the data storage 508. The order the bytes are stored in the data storage 508 may correspond to the order the bytes are transferred across the bus.

Figure 9:
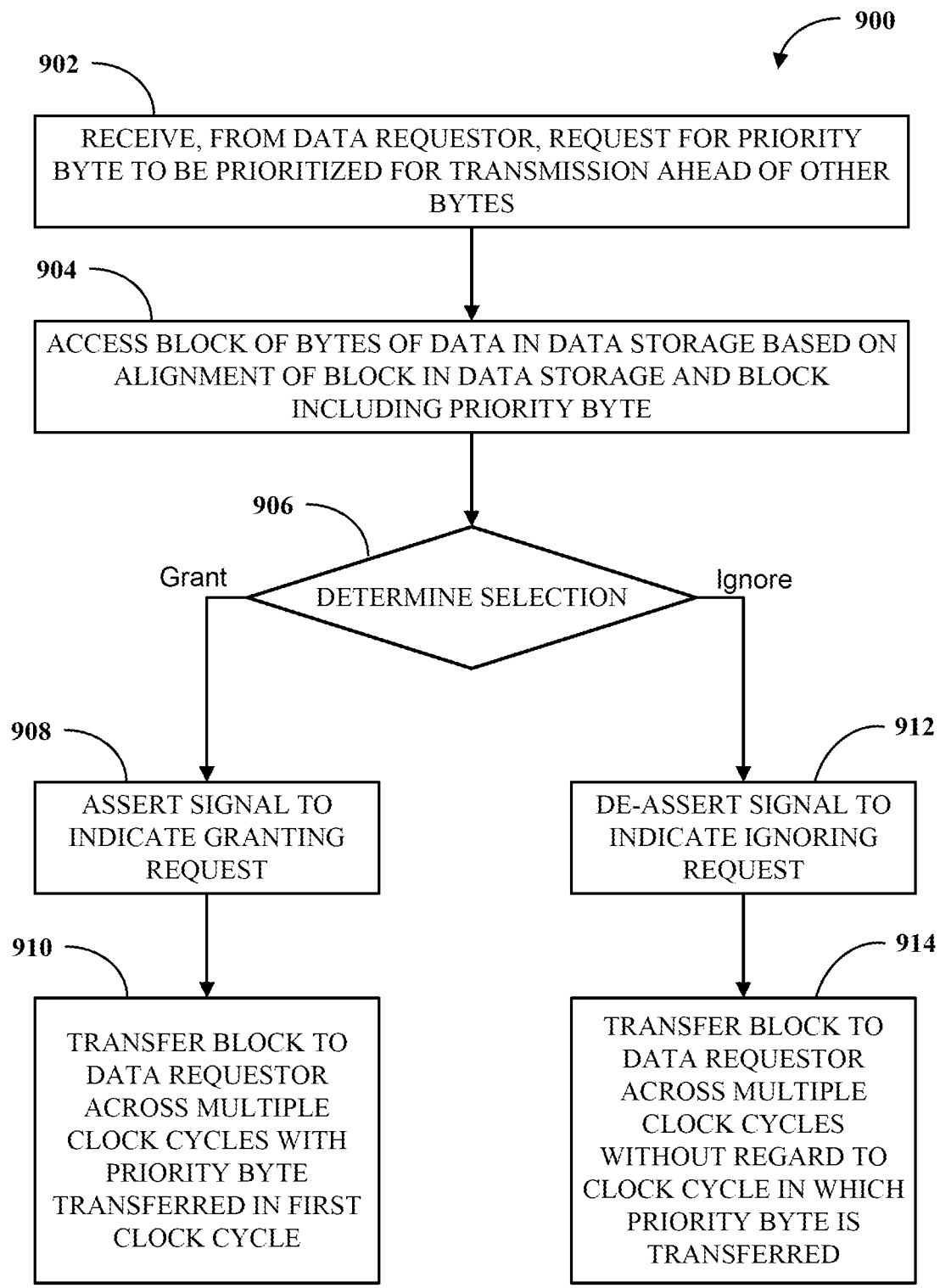
FIG. 9 is a flow chart of an exemplary technique for a data responder to selectively transfer data including a priority byte.

To further describe some implementations in greater detail, reference is next made to examples of techniques which may be performed by or using a system for selective transfer of data including a priority byte. FIG. 9 is a flow chart of an example of a technique 900 for a data responder to selectively transfer data including a priority byte. The technique 900 can be executed using computing devices, such as the systems, hardware, and software described with respect to FIGS. 1-8. For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a data responder may receive, from a data requestor, a request (e.g., an indication or hint) for a priority byte to be prioritized for transmission ahead of other bytes via a bus. The data responder could be implemented by, for example, a processor core, a cross bar, a cache, a memory controller, or a memory-mapped device. The bus could be, for example, a physical bus having a particular data width, such as 128 bits. The bus may be implemented by a point-to-point link between the data requestor and the data responder, such as the link 506. In some implementations, the data responder may receive the indication of the priority byte by receiving, from the data requestor, an address that fails to match a start address of the block in a data storage (e.g., providing an address that is misaligned relative to a power-of-two-sized byte range in a data storage, such as a cache line in the data storage 508).

At 904, the data responder may access a block of bytes of data in a data storage based on an alignment of the block in the data storage and the block including the priority byte. For example, the block may align with a natural alignment of data in the data storage, such as aligning relative to the power-of-two-sized byte range in the data storage. For example, the block may align according to a cache line boundary, a page boundary, or a word-alignment.

At 906, the data responder may determine a selection between (1) granting the request by transferring the block to the data requestor across multiple clock cycles via the bus with the priority byte transferred in a first clock cycle of the multiple clock cycles, and (2) ignoring the request (e.g., disregarding, rejecting, or declining the request) by transferring the block to the data requestor across multiple clock cycles via the bus with the priority byte transferred in a clock cycle after the first clock cycle. Granting the request may include wrapping the data by transferring the last or highest address byte of the block in the data storage before transferring the first or lowest address byte of the block in the data storage. Ignoring the request may include not wrapping the data, but transferring the first or lowest address byte of the block up to the last or highest address byte of the block in an order corresponding to storage of the block in the data storage. In some implementations, the data responder may determine to grant or ignore the request based on a latency associated with accessing the priority byte in a data storage. In some implementations, the data responder may determine to grant or ignore the request based on a based on a data width associated with the bus.

If at 906 the data responder determines to grant the request, at 908, the data responder may assert a signal on a wire, connected to the data requestor, to indicate a grant of the request and a transfer of the priority byte in a first clock cycle before other clock cycles of multiple clock cycles for transferring the block. At 910, the data responder may transfer the block to the data requestor across the multiple clock cycles via the bus with the priority byte transferred in the first clock cycle. However, if at 906 the data responder determines to ignore the request, at 912, the data responder may de-assert the signal on the wire, connected to the data requestor, to indicate ignoring the request and a transfer of the block across multiple clock cycles with the priority byte transferred in a clock cycle after the first clock cycle. At 914, the data responder may transfer the block to the data requestor across the multiple clock cycles via the bus without regard to which clock cycle the priority byte is transferred. For example, the priority byte may be transferred in a clock cycle after the first clock cycle. As a result, the data responder may select the mode by which the block is transferred so that data can be transferred in a manner that is efficient in the system.

Some implementations may include an apparatus that includes a data responder including circuitry configured to: receive, from a data requestor, a request for a priority byte to be prioritized for transmission, via a bus, ahead of other bytes; and assert a signal on a wire, connected to the data requestor, to indicate a grant of the request and a transfer of the priority byte in a first clock cycle before other clock cycles of multiple clock cycles for transferring a block of bytes of data. In some implementations, the data responder is configured to assert the signal based on a latency associated with accessing the priority byte in a data storage. In some implementations, the data responder is configured to assert the signal based on a data width associated with the bus. In some implementations, the data responder is configured to receive an indication of the priority byte by receiving, from the data requestor, an address that fails to match a start address of the block in a data storage. In some implementations, the circuitry is further configured to de-assert the signal on the wire to indicate ignoring the request and transferring the block across multiple clock cycles with the priority byte transferred in a clock cycle after the first clock cycle. In some implementations, the data responder is implemented by at least one of a cross bar, a cache, a memory controller, or a memory-mapped device.

Some implementations may include a method that includes receiving, from a data requestor, a request for a priority byte to be prioritized for transmission, via a bus, ahead of other bytes; and asserting a signal on a wire, connected to the data requestor, to indicate a grant of the request and a transfer of the priority byte in a first clock cycle before other clock cycles of multiple clock cycles for transferring a block of bytes of data. In some implementations, asserting the signal is based on a latency associated with accessing the priority byte in a data storage. In some implementations, asserting the signal is based on a data width associated with the bus. In some implementations, an indication of the priority byte is received by receiving, from the data requestor, an address that fails to match a start address of the block in a data storage. In some implementations, the method may include de-asserting the signal on the wire to indicate ignoring the request and transferring the block across multiple clock cycles with the priority byte transferred in a clock cycle after the first clock cycle. In some implementations, the method may include selecting the priority byte, by the data requestor, from among multiple bytes of data.

Some implementations may include a non-transitory computer readable medium comprising a circuit representation that, when processed by a computer, is used to program or manufacture an integrated circuit that includes a data responder including circuitry that: receives, from a data requestor, a request for a priority byte to be prioritized for transmission ahead of other bytes; accesses a block of bytes of data in a data storage based on an alignment of the block in the data storage, wherein the block includes the priority byte; and determines a selection between granting the request by transferring the block to the data requestor across multiple clock cycles via a bus with the priority byte transferred in a first clock cycle of the multiple clock cycles and ignoring the request by transferring the block to the data requestor across multiple clock cycles via the bus with the priority byte transferred in a clock cycle after the first clock cycle. In some implementations, the data responder determines the selection based on a latency associated with accessing the priority byte in the data storage. In some implementations, the data responder determines the selection based on a data width associated with the bus. In some implementations, the data responder receives an indication of the priority byte by receiving, from the data requestor, an address that fails to match a start address of the block in the data storage. In some implementations, the data responder including may include circuitry that asserts a signal on a wire, sent to the data requestor, indicating transfer of the priority byte in the first clock cycle, wherein the signal is asserted when granting the request. In some implementations, the data responder is implemented by at least one of a cross bar, a cache, a memory controller, or a memory-mapped device. In some implementations, the priority byte is selected by the data requestor from among multiple bytes of data that are requested. In some implementations, the block is aligned in a power-of-two-sized byte range in the data storage.

Some implementations may include a method that includes determining a selection between granting a request for a priority byte to be prioritized for transmission ahead of other bytes via a bus and ignoring the request, wherein granting the request includes transferring a block of bytes of data across multiple clock cycles with the priority byte transferred in a first clock cycle before other clock cycles of the multiple clock cycles, and wherein ignoring the request includes transferring the block across multiple clock cycles with the priority byte transferred in a clock cycle after the first clock cycle. In some implementations, granting the request includes wrapping a sequence of bytes of the block at a boundary of the block in a data storage when transferring the block. In some implementations, the selection is determined based on a latency associated with accessing the priority byte in a data storage. In some implementations, the selection is determined based on a data width associated with the bus for transferring the block. In some implementations, the method may include receiving the request by receiving an address that fails to match a start address of the block in a data storage. In some implementations, the method may include asserting a signal on a wire indicating transfer of the priority byte in the first clock cycle, wherein the signal is asserted when granting the request.

Some implementations may include a non-transitory computer readable medium comprising a circuit representation that, when processed by a computer, is used to program or manufacture an integrated circuit that includes a data responder including circuitry configured to: receive, from a data requestor, a request for a priority byte to be prioritized for transmission, via a bus, ahead of other bytes; and assert a signal on a wire, connected to the data requestor, to indicate a grant of the request and a transfer of the priority byte in a first clock cycle before other clock cycles of multiple clock cycles for transferring a block of bytes of data. In some implementations, the data responder asserts the signal based on a latency associated with accessing the priority byte in a data storage. In some implementations, the data responder asserts the signal based on a data width associated with the bus. In some implementations, the data responder receives an indication of the priority byte by receiving, from the data requestor, an address that fails to match a start address of the block in a data storage. In some implementations, the circuit representation, when processed by the computer, is used to program or manufacture the integrated circuit with the data responder including circuitry that: de-asserts the signal on the wire to indicate ignoring the request and transferring the block across multiple clock cycles with the priority byte transferred in a clock cycle after the first clock cycle. In some implementations, the data responder is implemented by at least one of a cross bar, a cache, a memory controller, or a memory-mapped device.

Some implementations may include a non-transitory computer readable medium comprising a circuit representation that, when processed by a computer, is used to program or manufacture an integrated circuit that includes a data responder including circuitry configured to: determine a selection between granting a request for a priority byte to be prioritized for transmission ahead of other bytes via a bus and ignoring the request, wherein granting the request includes transferring a block of bytes of data across multiple clock cycles with the priority byte transferred in a first clock cycle before other clock cycles of the multiple clock cycles, and wherein ignoring the request includes transferring the block across multiple clock cycles with the priority byte transferred in a clock cycle after the first clock cycle. In some implementations, granting the request includes wrapping a sequence of bytes of the block at a boundary of the block in a data storage when transferring the block. In some implementations, the selection is determined based on a latency associated with accessing the priority byte in a data storage. In some implementations, the selection is determined based on a data width associated with the bus for transferring the block. In some implementations, the data responder may include circuitry that receives the request by receiving an address that fails to match a start address of the block in a data storage. In some implementations, the data responder may include circuitry that asserts a signal on a wire indicating transfer of the priority byte in the first clock cycle, wherein the signal is asserted when granting the request.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures.

What is claimed is:

1. An apparatus, comprising:
   a data responder including circuitry configured to:
   receive, from a data requestor, a request for a priority byte to be prioritized for transmission, via a bus, ahead of other bytes; and
   assert a signal on a wire, connected to the data requestor, to indicate a grant of the request and a transfer of the priority byte in a first clock cycle before other clock cycles of multiple clock cycles for transferring a block of bytes of data.

2. The apparatus of claim 1, wherein the data responder is configured to assert the signal based on a latency associated with accessing the priority byte in a data storage.

3. The apparatus of claim 1, wherein the data responder is configured to assert the signal based on a data width associated with the bus.

4. The apparatus of claim 1, wherein the data responder is configured to receive an indication of the priority byte by receiving, from the data requestor, an address that fails to match a start address of the block in a data storage.

5. The apparatus of claim 1, wherein the circuitry is further configured to:
   de-assert the signal on the wire to indicate ignoring the request and transferring the block across multiple clock cycles with the priority byte transferred in any clock cycle.

6. The apparatus of claim 4, further comprising:
a width adapter including circuitry configured to:
   receive the indication from the data requestor;
   store information representative of the address that fails to match the start address of the block in the data storage;
   receive, from the data responder via a first data bus having a first width, a block of bytes of data having the priority byte in a first clock cycle of a first clock signal, wherein a location of the priority byte on the first data bus is according to the information; and
   forward, to the data requestor via a second data bus having a second width narrower than the first width, the block of bytes of data having the priority byte in a first clock cycle of a second clock signal, wherein a location of the priority byte on the second data bus is according to the information and a ratio of the first width to the second width.

7. A method, comprising:
receiving, from a data requestor, a request for a priority byte to be prioritized for transmission, via a bus, ahead of other bytes; and
asserting a signal on a wire, connected to the data requestor, to indicate a grant of the request and a transfer of the priority byte in a first clock cycle before other clock cycles of multiple clock cycles for transferring a block of bytes of data.

8. The method of claim 7, wherein asserting the signal is based on a latency associated with accessing the priority byte in a data storage.

9. The method of claim 7, wherein asserting the signal is based on a data width associated with the bus.

10. The method of claim 7, wherein an indication of the priority byte is received by receiving, from the data requestor, an address that fails to match a start address of the block in a data storage.

11. The method of claim 7, further comprising:
de-asserting the signal on the wire to indicate ignoring the request and transferring the block across multiple clock cycles with the priority byte transferred in any clock cycle.

12. The method of claim 7, further comprising:
selecting the priority byte, by the data requestor, from among multiple bytes of data.

13. A non-transitory computer readable medium comprising a circuit representation that, when processed by a computer, is used to program or manufacture an integrated circuit comprising:

a data responder including circuitry that:
   receives, from a data requestor, a request for a priority byte to be prioritized for transmission ahead of other bytes;
   accesses a block of bytes of data in a data storage based on an alignment of the block in the data storage, wherein the block includes the priority byte; and
   determines a selection between granting the request by transferring the block to the data requestor across multiple clock cycles via a bus with the priority byte transferred in a first clock cycle of the multiple clock cycles and ignoring the request by transferring the block to the data requestor across multiple clock cycles via the bus with the priority byte transferred in any clock cycle.

14. The non-transitory computer readable medium of claim 13, wherein the data responder determines the selection based on a latency associated with accessing the priority byte in the data storage.

15. The non-transitory computer readable medium of claim 13, wherein the data responder determines the selection based on a data width associated with the bus.

16. The non-transitory computer readable medium of claim 13, wherein the data responder receives an indication of the priority byte by receiving, from the data requestor, an address that fails to match a start address of the block in the data storage.

17. The non-transitory computer readable medium of claim 13, wherein the circuit representation, when processed by the computer, is used to program or manufacture the integrated circuit with the data responder including circuitry that:
   asserts a signal on a wire, sent to the data requestor, indicating a transfer of the priority byte in the first clock cycle, wherein the signal is asserted when granting the request.

18. The non-transitory computer readable medium of claim 13, wherein the data responder is implemented by at least one of a cross bar, a cache, a memory controller, or a memory-mapped device.

19. The non-transitory computer readable medium of claim 13, wherein the priority byte is selected by the data requestor from among multiple bytes of data that are requested.

20. The non-transitory computer readable medium of claim 13, wherein the block is aligned in a power-of-two-sized byte range in the data storage.

* * * * *